United States Patent
Kurasawa et al.

(10) Patent No.: US 10,055,042 B2
(45) Date of Patent: Aug. 21, 2018

(54) SENSOR-EQUIPPED DISPLAY DEVICE INCLUDING A CAPACITANCE-CHANGE LAYER

(71) Applicant: Japan Display Inc., Tokyo (JP)

(72) Inventors: Hayato Kurasawa, Tokyo (JP); Kazuyuki Kobayashi, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/181,732

(22) Filed: Jun. 14, 2016

(65) Prior Publication Data

US 2017/0010728 A1   Jan. 12, 2017

(30) Foreign Application Priority Data

Jul. 8, 2015 (JP) ................. 2015-136736

(51) Int. Cl.
| | |
|---|---|
| *G06F 3/041* | (2006.01) |
| *G06F 3/044* | (2006.01) |
| *G02F 1/1333* | (2006.01) |
| *G02F 1/1345* | (2006.01) |

(52) U.S. Cl.
CPC ........ *G06F 3/0414* (2013.01); *G02F 1/13338* (2013.01); *G02F 1/13452* (2013.01); *G06F 3/044* (2013.01); *G06F 3/0412* (2013.01); *G06F 3/0416* (2013.01); *G06F 2203/04102* (2013.01); *G06F 2203/04105* (2013.01); *G06F 2203/04111* (2013.01)

(58) Field of Classification Search
CPC ........ G06F 3/041–3/0416; G06F 2203/04102; G06F 2203/04103; G06F 2203/04105; G06F 2203/04111; G02F 1/13338; G02F 1/1345; G02F 1/13452

See application file for complete search history.

(56) References Cited

U.S. PATENT DOCUMENTS

2010/0328239 A1* 12/2010 Harada ................. G06F 3/0412
                                                                345/173
2012/0044202 A1* 2/2012 Ishizaki .............. G02F 1/13338
                                                                345/174

(Continued)

FOREIGN PATENT DOCUMENTS

| JP | 2010-128648 | 6/2010 | |
|---|---|---|---|
| JP | 2014-032437 | 2/2014 | |
| JP | WO 2015022939 A1 * | 2/2015 | ............ G06F 3/044 |

*Primary Examiner* — Nathan Danielsen
(74) *Attorney, Agent, or Firm* — K&L Gates LLP

(57) ABSTRACT

According to one embodiment, a sensor-equipped display device includes a drive electrode, a detection electrode including a first electrode and a second electrode disposed such that a gap is formed between the first electrode and the drive electrode and a gap is formed between the second electrode and the drive electrode, both of which change corresponding to a pressing force applied to the first and second electrodes, a driver configured to write a write signal to the drive electrode to produce a sensor signal, and a detector. The detector detects a position and a pressing force of an object on the basis of a change in a first capacitance between the first electrode and the drive electrode and a change in a second capacitance between the second electrode and the drive electrode.

13 Claims, 12 Drawing Sheets

(56) References Cited

U.S. PATENT DOCUMENTS

| | | | |
|---|---|---|---|
| 2013/0147740 A1* | 6/2013 | Wang | G06F 3/0412 |
| | | | 345/173 |
| 2014/0036166 A1 | 2/2014 | Kurasawa et al. | |
| 2015/0103032 A1* | 4/2015 | Bell | G06F 3/0412 |
| | | | 345/174 |
| 2015/0378491 A1* | 12/2015 | Worfolk | G06F 3/044 |
| | | | 345/174 |
| 2016/0034092 A1* | 2/2016 | Schmitt | G06F 3/0416 |
| | | | 345/174 |
| 2016/0062500 A1* | 3/2016 | Kessler | G06F 3/0414 |
| | | | 345/174 |
| 2016/0170535 A1* | 6/2016 | Iwamoto | G06F 3/044 |
| | | | 345/174 |

* cited by examiner

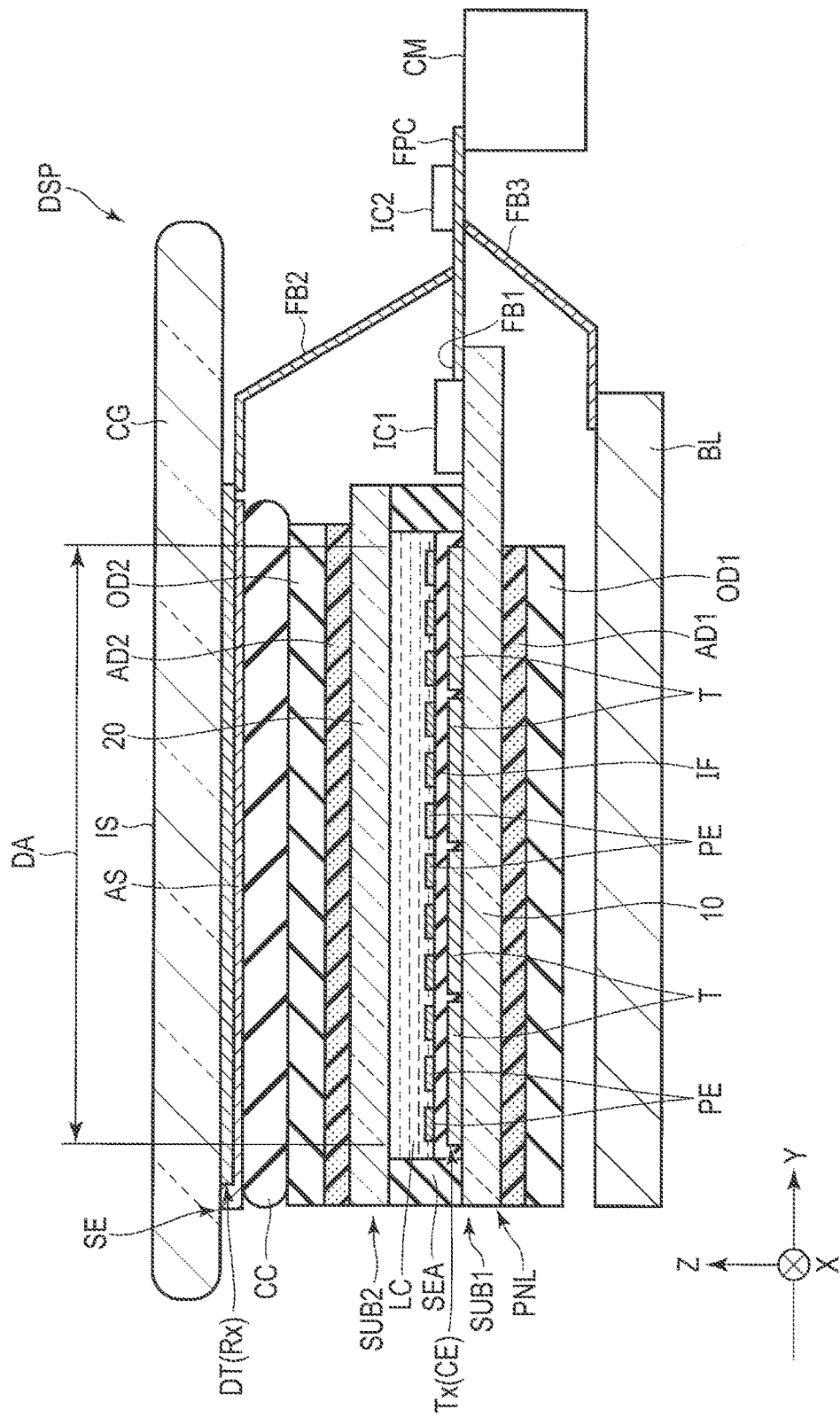
F I G. 1

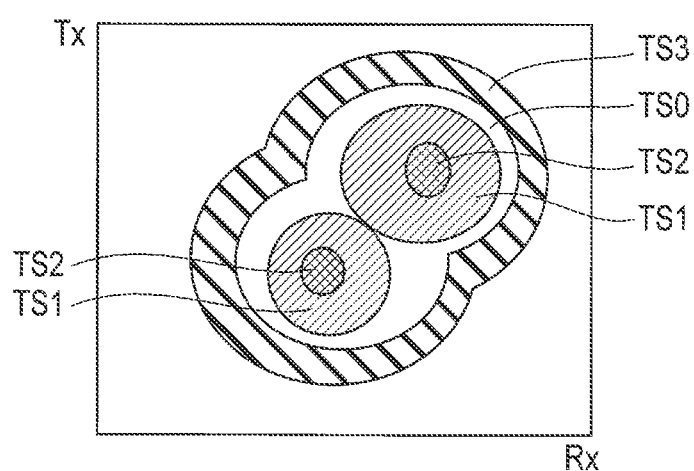
F I G. 12

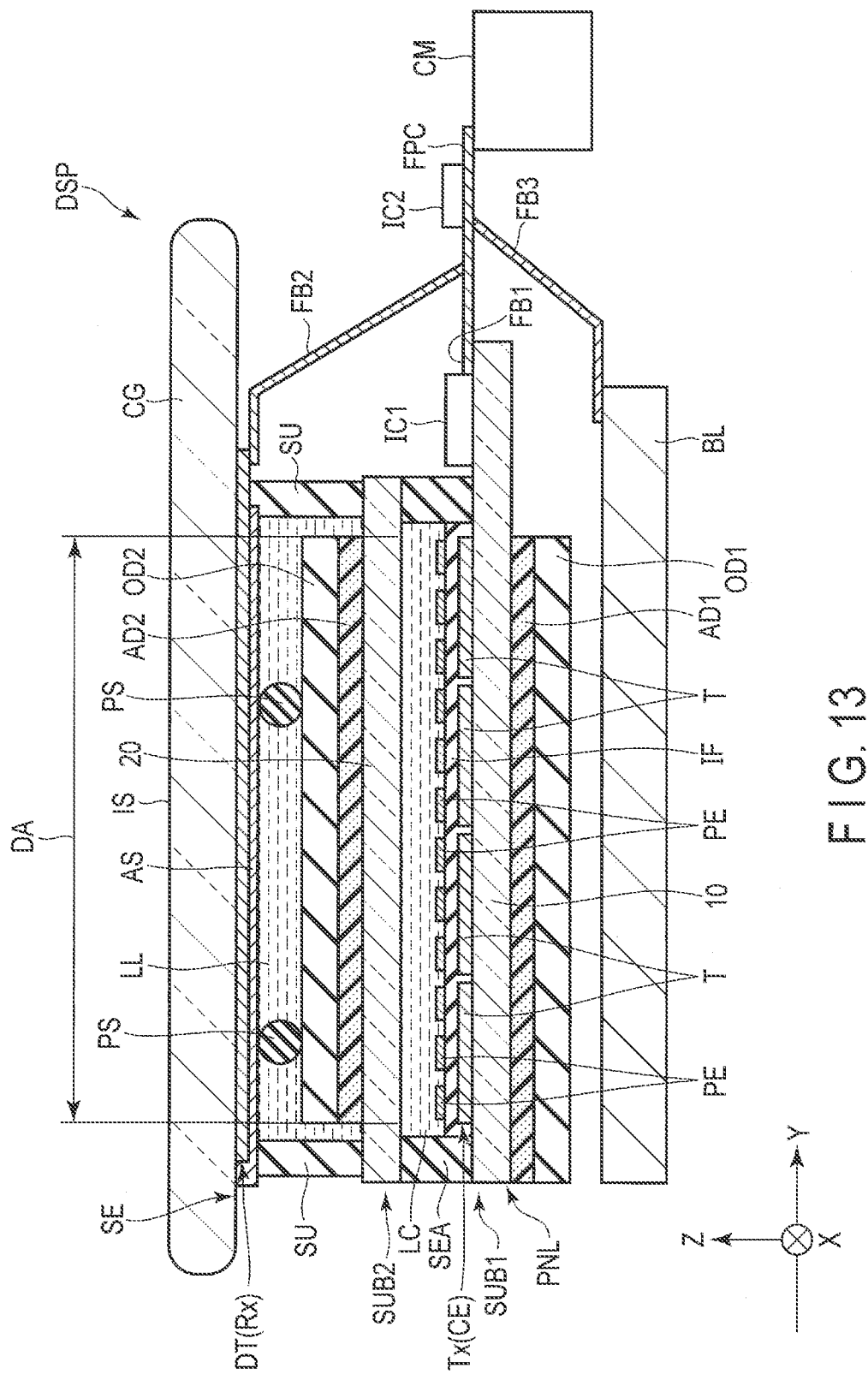
F I G. 13

SENSOR-EQUIPPED DISPLAY DEVICE INCLUDING A CAPACITANCE-CHANGE LAYER

CROSS-REFERENCE TO RELATED APPLICATIONS

This application is based upon and claims the benefit of priority from Japanese Patent Application No. 2015-136736, filed Jul. 8, 2015, the entire contents of which are incorporated herein by reference.

FIELD

Embodiments described herein relate generally to a sensor-equipped display device.

BACKGROUND

Sensor-equipped display devices, in which a sensor (which may be referred to as a touchpanel) is provided in a display device to detect a conductor approaching or contacting the sensor, have been commercialized. The sensor is, for example, a capacitance senor which detects a position of a conductor such as a finger on the basis of a change in capacitance. The sensor includes a detection electrode and a drive electrode.

Meanwhile, there is a well-known technique of using a common electrode as both an electrode for display equipped in the display panel and a drive electrode. Furthermore, in relation to the above technique, a display device may include a substrate opposed to the display panel, and a detection electrode may be formed to be opposed to the display panel of the substrate.

BRIEF DESCRIPTION OF THE DRAWINGS

FIG. 1 is a cross-sectional view which shows a liquid crystal display device DSP of an embodiment.

FIG. 12 shows another example of distributions of a pressing force detected by the sensor SE.

FIG. 13 shows another example of the embodiment.

DETAILED DESCRIPTION

Figure 2:
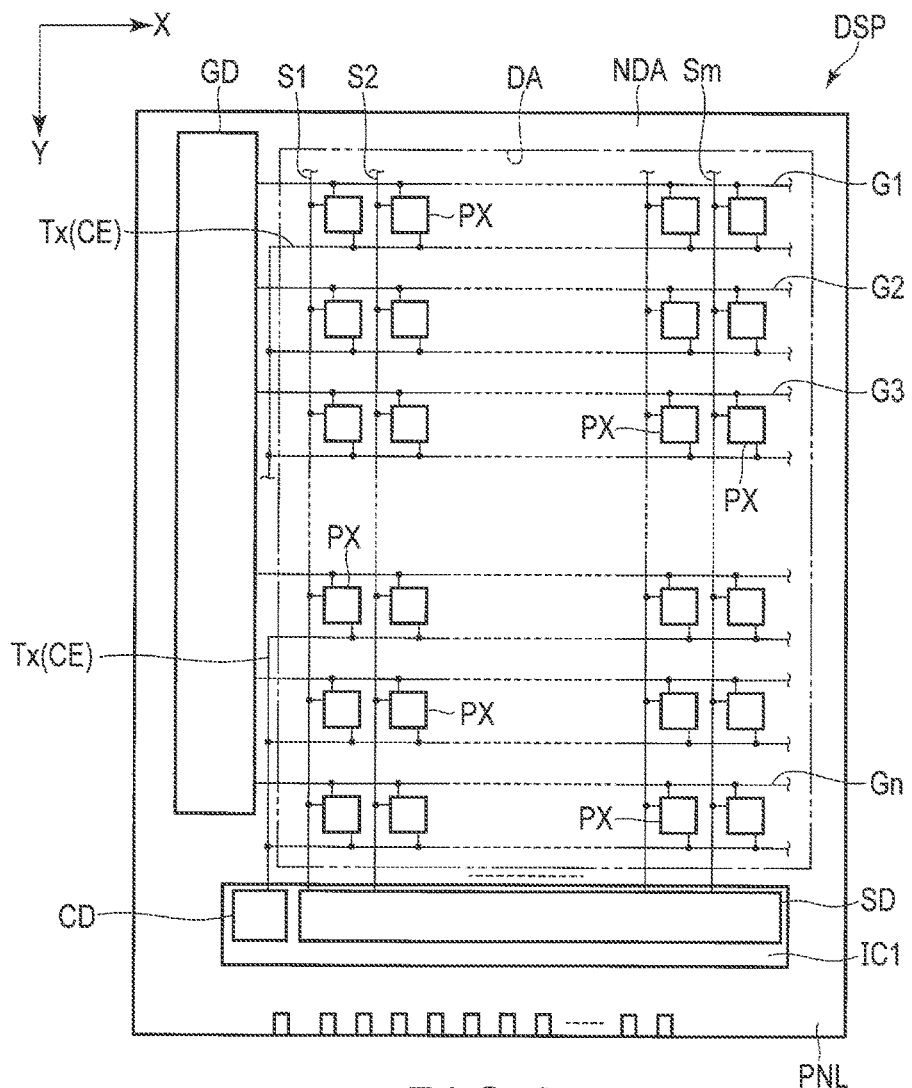
FIG. 2 shows the basic structure and the equivalent circuit of the liquid crystal display device DSP of FIG. 1.

In general, according to one embodiment, a sensor-equipped display device includes a drive electrode, a detection electrode including a first electrode and a second electrode disposed such that a gap is formed between the first electrode and the drive electrode and a gap is formed between the second electrode and the drive electrode, both of which change corresponding to a pressing force applied to the first and second electrodes, a driver configured to write a write signal to the drive electrode to produce a sensor signal corresponding to a capacitance between the drive electrode and the detection electrode, and a detector configured to read a signal indicative of a change in the sensor signal from the detection electrode. The detector detects a position and a pressing force of an object on the basis of a change in a first capacitance between the first electrode and the drive electrode and a change in a second capacitance between the second electrode and the drive electrode.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

(First Embodiment)

Now, a sensor-equipped display device of the present embodiment will be explained. In the present embodiment, the sensor-equipped display device is a liquid crystal display device. FIG. 1 is a cross-sectional view of a liquid crystal display device DSP of the present embodiment.

As shown in FIG. 1, the liquid crystal display device DSP includes a display panel PNL, first optical element OD1, second optical element OD2, cover member CG, detector DT (Rx), capacitance-change layer CC, antistatic layer AS, backlight unit BL which illuminates the display panel PNL, drive IC chips IC1 and IC2, control module CM, and flexible printed circuit FPC. The drive IC chip IC1 drives the display panel PNL, and the drive IC chip IC2 drives the display panel PNL, detector DT, and backlight unit BL.

The display panel PNL includes a plate-like first substrate SUB1, plate-like second substrate SUB2 opposed to the first substrate SUB1, and liquid crystal layer LC interposed between the first substrate SUB1 and the second substrate SUB2. The display panel PNL includes a display area (active area) DA used for image display. The first substrate SUB1 and the second substrate SUB2 are adhered to each other by a sealant SEA outside the display area DA.

The first substrate SUB1 is formed of, for example, a light-transmissive first insulating substrate 10 such as a glass substrate or a resin substrate. The first substrate SUB1 includes, on the first insulating substrate 10 opposing the second substrate SUB2, a drive electrode Tx, a plurality of pixel electrodes PE, and insulating film IF interposed between the drive electrode Tx and the pixel electrodes PE. The drive electrode Tx includes a plurality of electrodes T. The drive electrode Tx functions as a common electrode CE for image display. Hereinafter, the drive electrode Tx may occasionally be referred to as common electrode CE. The pixel electrodes PE are opposed to the drive electrode Tx. The pixel electrodes PE and the drive electrode Tx are formed of a transparent conductive material such as indium tin oxide (ITO), indium zinc oxide (IZO), or zinc oxide (ZnO). The electrodes T of the drive electrode Tx extend in the first direction X and are arranged in the second direction Y at intervals. The second substrate SUB2 is formed of, for example, a light-transmissive second insulating substrate 20 such as a glass substrate or a resin substrate.

Note that, although the display panel PNL in the figure is structure to correspond to a fringe field switching (FFS) mode as its display mode, other display modes may be adopted. For example, the display panel PNL may be structure to correspond to an in-plane switching (IPS) mode in which a transverse field being substantially parallel with the substrate main surface is mainly used. FFS mode is a type of IPS modes. In the display mode using a transverse field, both the pixel electrodes PE and the common electrode CE can be disposed on the first substrate SUB1, for example. Alternatively, the display panel PNL may be structure to correspond to a display mode mainly using a vertical field produced between substrate main surfaces such as twisted nematic (TN) mode, optically compensated bend (OCB) mode, or vertically aligned (VA) mode. In the display mode using a vertical field, the pixel electrodes PE are disposed on the first substrate SUB1 and the common electrode CE is disposed on the second substrate SUB2. Note that the substrate main surface is a surface parallel with the X-Y plane which is defined by first direction X and second direction Y which are orthogonal to each other.

Here, the first direction X and the second direction Y are orthogonal to each other; however, they may cross at an angle other than 90 degrees. The third direction Z is orthogonal to the first direction X and the second direction Y. The third direction Z corresponds to a thickness of the display panel PNL.

In the present embodiment, the display panel PNL is a transmissive display panel which includes a transmissive display function to display an image by selectively passing light from the backlight unit BL. Note that the display panel PNL may be a reflective display panel which includes a reflective display function to display an image by selectively reflecting light from the display surface side such as external light and auxiliary light. Alternatively, a transflective display panel including both the transmissive display function and the reflective display function may be adopted.

The first optical element OD1 is adhered to the first insulating substrate 10 by an adhesive agent AD1. The second optical element OD2 is adhered to the second insulating substrate 20 by an adhesive agent AD2. The first optical element OD1 and the second optical element OD2 each include at least a polarizer, and they may include a phase difference plate, if necessary. The absorption axis of the polarizer of the first optical element OD1 crosses the absorption axis of the polarizer of the second optical element OD2. For example, the absorption axes of the polarizers may be orthogonal to each other.

The cover member CG is positioned outside the display panel PNL and is opposed to the second substrate SUB2 side of the display panel PNL. The liquid crystal display device DSP includes an input surface IS to which an object approaches or contacts, and in this example, the input surface IS is opposite to the surface of the cover member CG opposed to the display panel PNL. In the X-Y plan view, the dimension of the cover member CG is larger than the dimension of the second substrate SUB2 and the dimension of the first substrate SUB1. In the second direction Y, the cover member CG is longer than the second substrate SUB2 and the first substrate SUB1. The cover member CG is formed of, for example, a glass substrate. In that case, the cover member CG may be referred to as a cover glass. Alternatively, the cover member CG may be formed using a light transmissive substrate such as a resin substrate.

The detector DT is disposed on the cover member CG to be opposed to the display panel PNL. The detector DT includes, for example, a detection electrode Rx extending in the second direction Y. The detection electrode Rx is disposed on the cover member CG to be opposed to the display panel PNL and crosses the drive electrode Tx extending in the first direction X. The drive electrode Tx and the detector DT form a capacitance sensor SE.

The capacitance-change layer CC is disposed on the second optical element OD2 to be opposite to the surface opposed to the display panel PNL and between the detection electrode Rx and the drive electrode Tx. The capacitance-change layer CC is elastically deformable corresponding to a pressing force applied externally. That is, the capacitance-change layer CC has an elastic deformation capacity. The capacitance-change layer CC deforms while a pressing force is applied thereto and reforms when application of the pressing force ceases. That is, the thickness of the capacitance-change layer CC reduces with a pressing force applied thereto and gradually regains its original thickness after there is no more pressing force.

The capacitance-change layer CC may include elastic resin, or an elastic adhesive film, or the layer CC may include liquid, or air gap therein as described later. Upon application of a pressing force to the input surface IS of the cover member CG, the capacitance-change layer CC deforms corresponding to the deformation of the cover member CG such that a gap between the detection electrode Rx and the drive electrode Tx changes. The thickness of the capacitance-change layer CC is a tenth or more of the thickness of the cover member CG. Furthermore, the capacitance-change layer CC may have a function to adhere the cover member CG and the display panel PNL.

The antistatic layer AS is disposed between the detection electrode Rx and the capacitance-change layer CC. However, the position of the antistatic layer AS is optional and determined within the liquid crystal display device DSP to meet a design requirement.

The backlight unit BL is disposed in the rear side of the first substrate SUB1. Various types of the backlight unit BL are adoptable, and a light source may be light emitting diode or the like. Explanation of detailed structure is omitted. Note that, if the display panel PNL is a reflective type which includes a reflective display function alone, the backlight unit BL is excluded.

The drive IC chip IC1 is mounted on the first substrate SUB1 of the display panel PNL. The flexible printed circuit FPC is connected to the control module CM. The flexible printed circuit FPC includes a first branch FB1, second branch FB2, and third branch FB3. The first branch FB1 is connected to the display panel PNL. The second branch FB2 is connected to the detector DT. The third branch FB3 is connected to the backlight unit BL. The drive IC chip IC2 is mounted on the flexible printed circuit FPC.

Drive IC chips IC1 and IC2 are connected to each other via the flexible printed circuit FPC or the like. Note that connection of the control module CM, display panel PNL, detector DT, and backlight unit BL can be achieved through various ways. For example, three independent flexible printed circuits of first, second, and third flexible printed circuits may be used instead of the flexible printed circuit FPC. In that case, the control module CM and the display panel PNL are connected by the first flexible printed circuit, the control module CM and the detector DT are connected by the second flexible printed circuit, and the control module CM and the backlight unit BL are connected by the third flexible printed circuit. In that case, for example, the drive IC chip IC2 may be mounted on any one of the first to third flexible printed circuits or may be mounted separately on the second and third flexible printed circuits.

The control module CM and the drive IC chips IC1 and IC2 drive the sensor SE. The control module CM may be referred to as an application processor instead. The drive IC chip IC2 can send a timing signal which indicates a drive time of the sensor SE to the drive IC chip IC1. Or, the drive IC chip IC1 can send a timing signal which indicates a drive time of the drive electrode Tx to the drive IC chip IC2. Or, the control module CM can send a timing signal to each of the drive IC chips IC1 and IC2. With the timing signals, the driving of drive IC chip IC1 and that of drive IC chip IC2 can be synchronized. Furthermore, the control module CM can control the driving of the backlight unit BL.

FIG. 2 shows the basic structure and the equivalent circuit of the liquid crystal display device of FIG. 1. The liquid crystal display device DSP includes an active matrix display panel PNL.

As shown in FIG. 2, the display panel PNL includes a gate line drive circuit GD disposed in a non-display area NDA which is outside the display area DA. The drive IC chip IC1 is disposed in the non-display area NDA. In the present embodiment, the drive IC chip IC1 includes a source line drive circuit SD and a common electrode drive circuit CD. Note that the drive IC chip IC1 may at least include a part of the source line drive circuit SD and the common electrode drive circuit CD. The non-display area NDA is a rectangular frame-like shape surrounding the display area DA. Note that the display area DA may be a circle, ellipse, or rectangle which is partly bent instead of the rectangle.

The display panel PNL includes a plurality of pixels PX in the display area DA. The pixels PX are arranged as m x n matrix in the first direction X and the second direction Y (where each of m and n is a positive integer). Furthermore, the display panel PNL includes, in the display area DA, gate lines G (G1 to Gn), source lines S (S1 to Sm), and common electrode CE.

Gate lines G extend substantially linearly in the first direction X and are drawn outside the display area DA to be connected to the gate line drive circuit GD. Furthermore, gate lines G are arranged in the second direction Y at intervals. Source lines S extend substantially linearly in the second direction Y and are drawn outside the display area DA to be connected to the source line drive circuit SD. Furthermore, source lines S are arranged in the first direction X at intervals to cross gate lines G. Note that gate lines G and source lines S do not necessarily extend linearly and may partly bend. The common electrode CE is at least disposed inside the display area DA and is electrically connected to the common electrode drive circuit CD. The common electrode CE is shared by the pixels PX.

Figure 3:
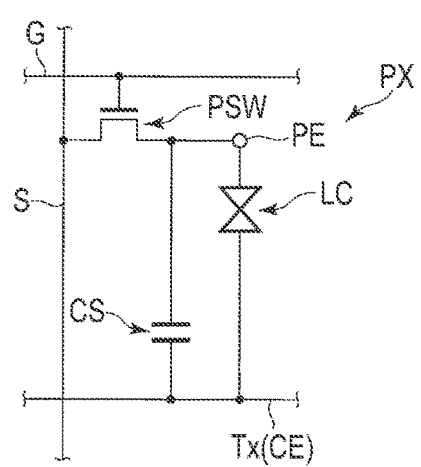
FIG. 3 is an equivalent circuit diagram of a pixel PX of FIG. 2.

FIG. 3 is an equivalent circuit diagram of the pixel PX of FIG. 2.

As shown in FIG. 3, each pixel PX includes, for example, a pixel switching element PSW, pixel electrode PE, common electrode CE, and liquid crystal layer LC. The pixel switching element PSW is, for example, a thin film transistor. The pixel switching element PSW is electrically connected to a gate line G and a source line S. The pixel switching element PSW may be either top-gate type or bottom-gate type. While a semiconductor layer of the pixel switching element PSW is formed of polysilicon, it may be formed of amorphous silicon or oxide semiconductor instead. The pixel electrode PE is formed of a transparent conductive film such as ITO and is electrically connected to the pixel switching element PSW. The pixel electrode PE is opposed to the common electrode CE. The common electrode CE, insulating film (the insulating film IF), and pixel electrode PE form a retaining capacitance CS.

Figure 4:
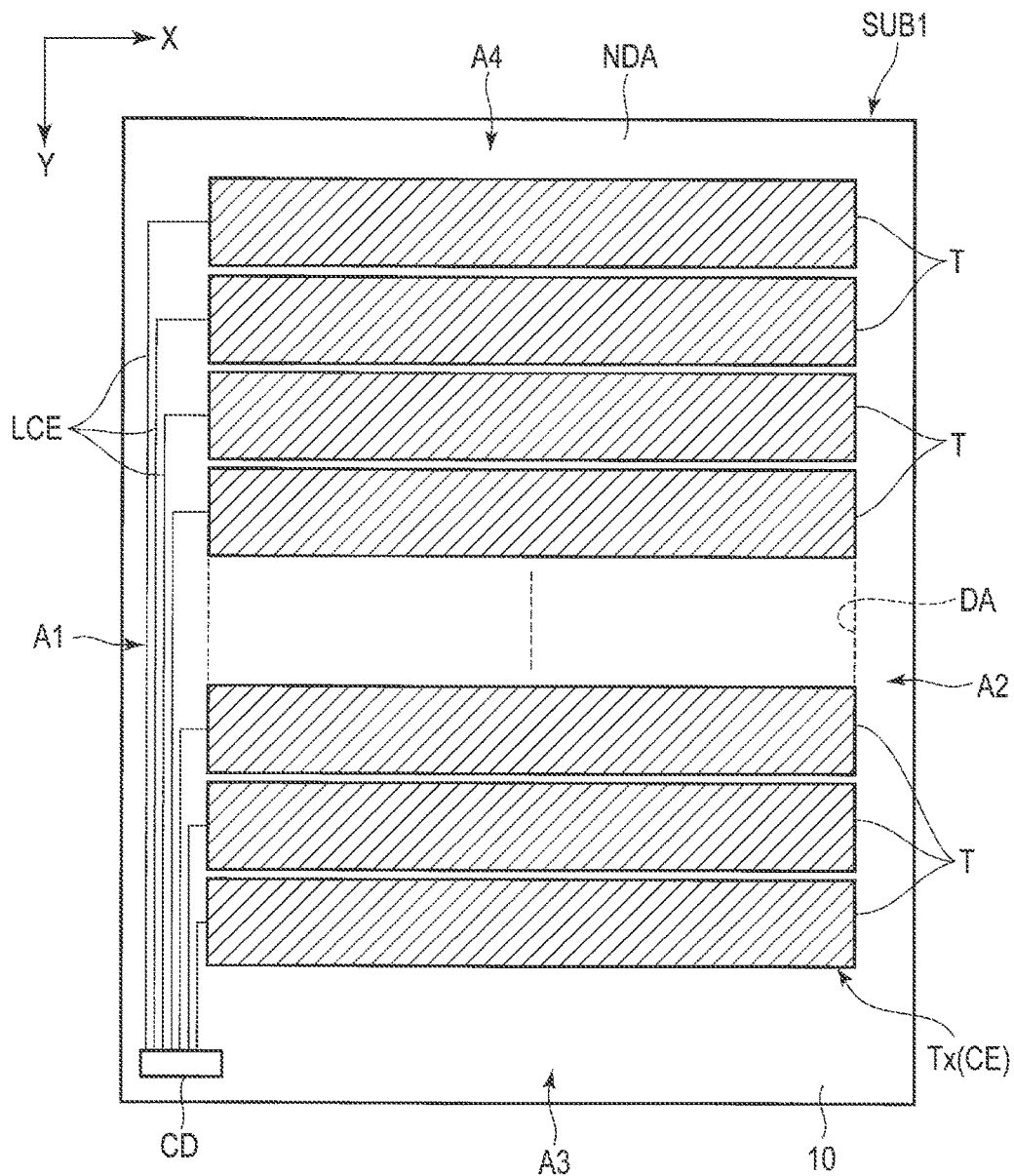
FIG. 4 is a plan view which shows the first substrate SUB1 of the liquid crystal display device DSP, in which a first insulating substrate 10, a plurality of electrodes T of a drive electrode Tx, a plurality of lead lines LCE, and common electrode drive circuit CD are depicted.

FIG. 4 is a plan view of the first substrate SUB1 of the liquid crystal device DSP, and in which the first insulating substrate 10, a plurality of electrode T of the drive electrode Tx, a plurality of lead lines LCE, and common electrode drive circuit CD are depicted.

As shown in FIG. 4, the electrodes T are each formed in a band-like shape, and extend in the first direction X and are arranged in the second direction Y at intervals. In the present embodiment, the drive electrode Tx is formed inside the display area DA; however, no limitation is intended thereby. The drive electrode Tx may partly be formed to extend into the non-display area NDA.

Lead lines LCE are disposed in the non-display area NDA to electrically connect the electrodes T to the common electrode drive circuit CD. In this example, lead lines LCE are electrically connected to electrodes T in a one-on-one manner. The lead lines LCE are formed of a transparent conductive material such as ITO, IZO, or ZnO; however, they may be formed of a metal instead.

Here, the non-display area NDA is, for the explanation sake, divided to a first area A1 positioned left of the display area DA (a band-like area extending in the second direction Y), second area A2 positioned right of the display area DA (a band-like area extending in the second direction Y), third area A3 positioned below the display area DA (a band-like area extending in the first direction X), and fourth area A4 positioned above the display area DA (a band-like area extending in the first direction X). For example, the common electrode drive circuit CD is positioned in the third area A3 where the first branch FB1 is laid, and lead lines LCE extend into the first area A1 and the third area A3.

Figure 5:
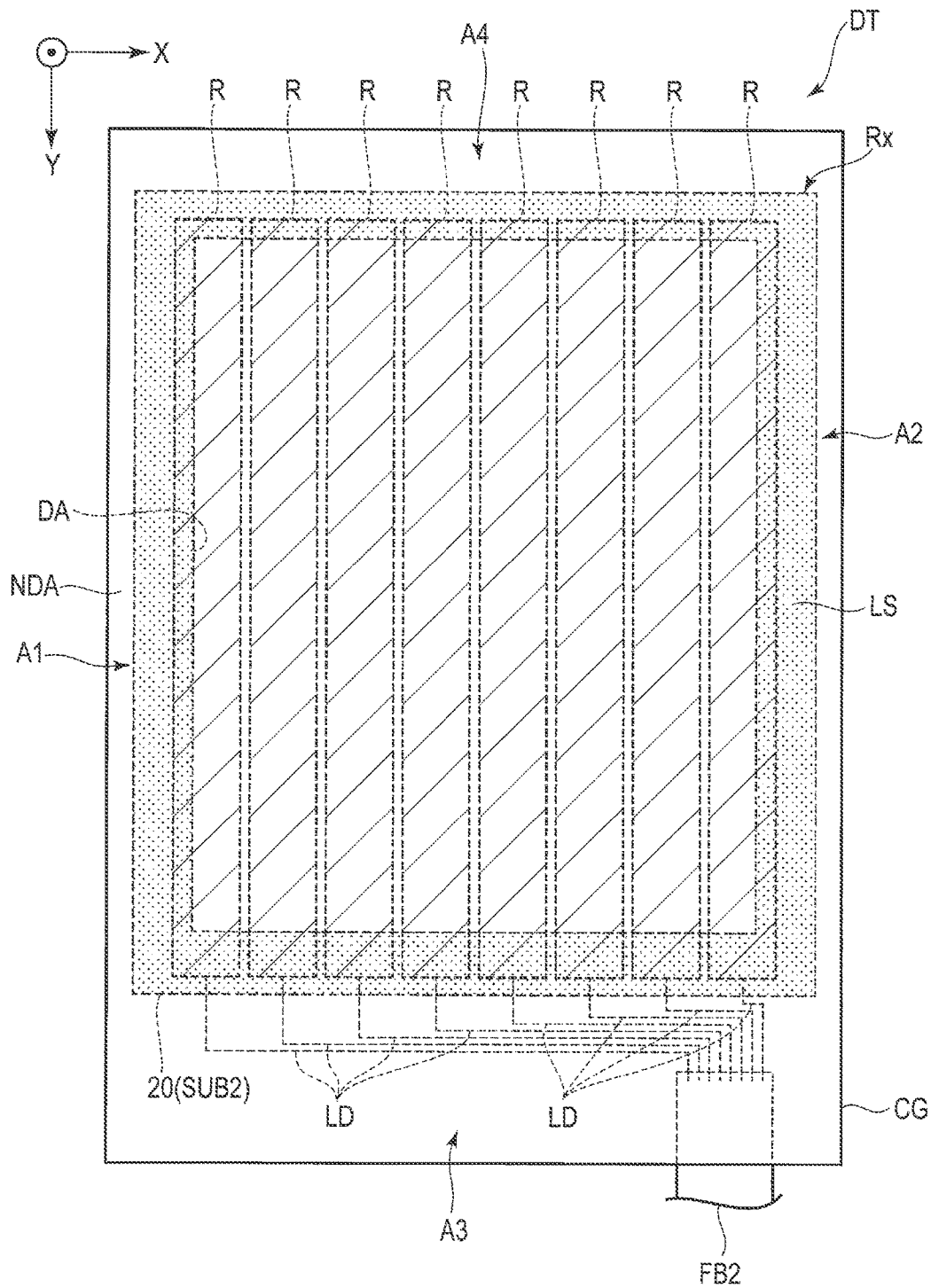
FIG. 5 is a plan view which shows the liquid crystal display device DSP, in which a cover member CG, detector DT, second branch FB2 of flexible printed circuit FPC, second insulating substrate 20, and peripheral light shielding layer LS are depicted.

FIG. 5 is a plan view which shows a part of the liquid crystal display device DSP, and in which the cover member CG, detector DT, second branch FB2 of flexible printed circuit FPC, second insulating substrate 20, and peripheral light shielding layer LS. FIG. 5 is a plan view which shows the detector DT from the opposite direction of the third direction Z.

As in FIG. 5, the peripheral light shielding layer LS is disposed in the non-display area NDA of the second substrate SUB2. The peripheral light shielding layer LS extends to substantially the entirety of the non-display area NDA of the second substrate SUB2. For example, the peripheral light shielding layer LS is opposed to the first substrate SUB1 of the second insulating substrate 20.

The detector DT includes a plurality of electrodes R of the detection electrode Rx and a plurality of lead lines LD.

Electrodes R are each formed in a band-like shape, and they extend in the second direction Y and are arranged in the first direction X at intervals.

In this embodiment, the left edge of the leftmost detection electrode Rx of the detection electrodes Rx is disposed in the first area A1 to be opposed to the peripheral light shielding layer LS. The right edge of the rightmost detection electrode Rx of the detection electrodes Rx is disposed in the second area A2 to be opposed to the peripheral light shielding layer LS. Furthermore, one ends of the detection electrodes Rx are disposed in the fourth area A4 to be opposed to the peripheral light shielding layer LS. The other ends of the detection electrodes Rx are disposed in the third area A3 to be opposed to the peripheral light shielding layer LS.

Lead lines LD are disposed in the non-display area NDA to electrically connect the detection electrodes Rx to the second branch FB2. Here, lead lines LD are electrically connected to detection electrodes Rx in a one-on-one manner. Lead lines LD extend into the third area A3.

The detection electrode Rx is formed of a transparent conductive material such as ITO, IZO, or ZnO. As with the detection electrode Rx, lead lines LD are formed of a transparent conductive material such as ITO, IZO, or ZnO; however, they may be formed of a metal fragment having a thickness of a few to several tens of micrometers instead.

Now, an operation of the FFS mode liquid crystal display device DSP during a display drive phase in which an image is displayed will be explained.

First, an off-state where no voltage is applied to the liquid crystal layer LC will be explained. The off-state is a state where a potential difference is not formed between the pixel electrodes PE and the common electrode CE. In this off-state, liquid crystal molecules in the liquid crystal layer LC are initially aligned in the same orientation within the X-Y plane by the alignment restriction force between the first substrate SUB1 and the second substrate SUB2. The light from the backlight unit BL partly passes through the polarizer of the first optical element OD1 and enters the liquid crystal display panel PNL. The light entering the liquid crystal display panel PNL is linearly polarized orthogonal to the absorption axis of the polarizer. The state of linear polarization does not substantially change when the light passes though the liquid crystal display panel PNL in the off-state. Thus, the greater part of the linearly polarized light which has passed through the display panel PNL is absorbed by the polarizer of the second optical element OD2 (black display). The black display mode of the display panel PNL in the off-state is referred to as normally black mode.

Now, an on-state where a voltage is applied to the liquid crystal layer LC will be explained. The on-state is a state where a potential difference is formed between the pixel electrodes PE and the common electrode CE. That is, a common drive signal (common voltage) is supplied to the common electrode CE from the common electrode drive circuit CD. Furthermore, an image signal to form the potential difference with respect to the common potential is supplied to the pixel electrodes PE. Consequently, a fringe field is generated between the pixel electrodes PE and the common electrode CE in the on-state.

In this on-state, the liquid crystal molecules are aligned in an orientation different from that of the initial alignment within X-Y plane. In the on-state, light, linearly polarized orthogonal to the absorption axis of the polarizer of the first optical element OD1, enters the display panel PNL and its polarization changes depending on the alignment of the liquid crystal molecules when it passes through the liquid crystal layer LQ. Thus, in the on-state, part of the light which has passed through the liquid crystal layer LQ at least passes through the polarizer of the second optical element OD2 (white display).

Now, an operation of the liquid crystal display device DSP during a sensing drive phase in which sensing of an approach or a contact of an object with respect to the input surface IS is performed will be explained. That is, the drive IC chips IC1 and IC2 and the control module CM of the liquid crystal display device DSP control driving of the drive electrodes Tx and the detection electrodes Rx to perform sensing. Note that the sensing mode explained here may be referred to as a mutual-capacitive sensing mode. In the mutual-capacitive sensing mode, X and Y coordinates of a position of an input can be detected specifically based on a change in capacitance between the drive electrodes Tx and detection electrodes Rx. Furthermore, in the present embodiment, a pressing force applied to the input surface IS will be detected based on a change in the capacitance between the drive electrodes Tx and the detection electrodes Rx.

Figure 6:
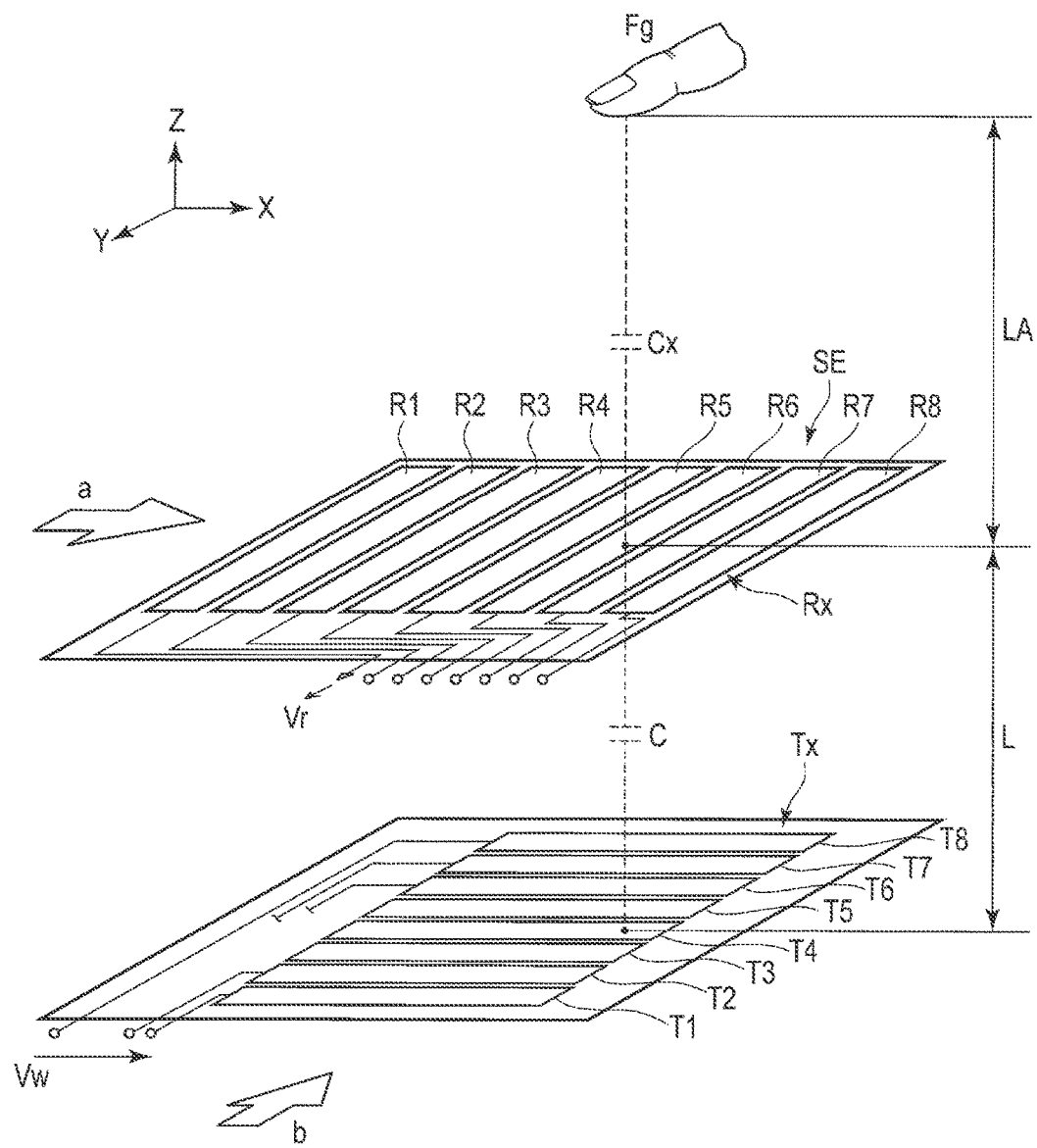
FIG. 6 shows a principle of a sensing method.

FIG. 6 shows a principle of the sensing method. In this example, a finger Fg is a conductive object of an input on the liquid crystal display device DSP.

In FIG. 6, the detection electrodes Rx include eight electrodes R1 to R8. Furthermore, the drive electrodes Tx include eight electrodes T1 to T8. Here, in the detection electrodes Rx, ith electrode R from the left will be referred to as electrode Ri, and in the drive electrodes Tx, jth electrode T from the bottom will be referred to as electrode Tj. Thus, in the detection electrodes Rx, 6th electrode R from the left is electrode R6, and in the drive electrodes Tx, 4th electrode T from the bottom is electrode T4. In this example, the finger Fg is given on a crossing point of electrode R6 and electrode T4.

As shown in FIG. 6, a gap L is provided in the third direction Z between the detection electrodes Rx and the drive electrodes Tx. Note that, as shown in FIG. 1, the elastic capacitance-change layer CC is disposed between the detection electrodes Rx and the drive electrodes Tx and deforms when a pressing force is applied to the input surface IS of the cover member CG to correspond to the deformation of the cover member CG. Therefore, the gap L varies corresponding to the pressing force applied to the input surface IS. Capacitance coupling is made between the drive electrodes Tx and the detection electrodes Rx, and interelectrode capacitance C is produced between the drive electrodes Tx and the detection electrodes Rx.

The finger Fg approaches the detection electrodes Rx from the side opposite to the side opposed to the drive electrodes Tx. The finger Fg is positioned above electrode R6 with a gap LA therebetween in the third direction Z. Coupling capacitance Cx is produced between the finger Fg and electrode R6.

Here, as an example, a relationship between the gap LA, gap L, interelectrode capacitance C, and coupling capacitance Cx at a crossing position of electrode R6 and electrode T4 will be explained. Note that, if the finger Fg approaches or contacts other positions, the result acquired thereby becomes substantially the same, and thus, explanation considered redundant will be omitted.

In the initial state, the finger Fg does not approach or contact the input surface IS, or other words, the detection electrodes Rx, and therein, no coupling capacitance Cx is produced between the finger Fg and the detection electrodes Rx. On the other hand, interelectrode capacitance C becomes initial capacitance C0. The gap L is gap L0.

Then, when the finger Fg approaches the input surface IS, that is, the finger Fg approaches electrode R6 with a gap LA therebetween, coupling capacitance Cx is formed between the finger Fg and electrode R6. With decrease of the gap LA, coupling capacitance Cx increases. In other words, as the finger Fg approaches electrode R6 closer, coupling capacitance Cx increases. On the other hand, interelectrode capacitance C becomes less than initial capacitance C0 at electrode R6 where coupling capacitance Cx is formed. This is because a field between electrode R6 and electrode T4 is partly formed between the finger Fg and electrode R6 as the finger Fg approaches electrode R6. When coupling capacitance Cx becomes larger, interelectrode capacitance C becomes smaller. That is, when the gap LA becomes smaller by the finger Fg approaching electrode R6, interelectrode capacitance C becomes smaller.

Then, when the finger Fg contacts the input surface IS, the gap LA is minimized and coupling capacitance Cx is maximized. Therein, interelectrode capacitance C is minimized.

Note that, when the finger Fg approaches or contacts the input surface IS, interference capacitance C at a position in the proximity of the crossing point of electrode R6 and electrode T4 decreases. Such a change in interelectrode capacitance C will be detailed later.

Then, while the finger Fg is applying the pressing force to the input surface IS, that is, when the gap LA is minimized, coupling capacitance Cx is maximized. On the other hand, gap L at the crossing point of electrode R6 and electrode T4 becomes smaller as compared to gap L0 before pressing. As the pressing force of the finger Fg applied to the input surface IS increases, gap L becomes smaller. As gap L becomes smaller, interelectrode capacitance C increases. Interelectrode capacitance C formed between electrode R6 and electrode T4 is acquired as a sum of a decrement of interelectrode capacitance due to reduced gap LA and an increment of interelectrode capacitance due to reduced gap L.

Note that, while the finger Fg is applying the pressing force to the input surface IS, interelectrode capacitance C increases in the proximity of the crossing point of electrode R6 and electrode T4. Such a change in interelectrode capacitance C will be detailed later.

To perform sensing with the sensor SE structured as above, the drive IC chip IC1 functioning as a driver initially writes a pulse-like write signal (sensor drive signal) Vw to the drive electrodes Tx to produce a sensor signal which corresponds to the capacitance between the drive electrodes Tx and the detection electrodes Rx. Then, the drive IC chip IC2 functioning as a detector reads a read signal Vr indicative of a change in the sensor signal from the detection electrodes Rx (for example, a capacitance of the detection electrodes Rx). Based on a time when the write signal Vw is supplied to the drive electrodes Tx and the read signal Vr from the detection electrodes Rx, the position and pressing force of the finger Fg.

The display drive and sensing drive operations are performed within one frame period. In an example, one frame period can be divided into a first period in which an image is displayed, and a second period in which a position and a pressing force of an object are detected. In the first period, the display drive operation is performed to write an image signal to the entire pixels PX in the display area DA in a time-sharing manner (display period). Furthermore, in the second period after the first period, the sensing drive operation is performed to detect a position and a pressing force of an object in the entirety of the display area DA in a time-sharing manner (detection period or sensing period). In the present embodiment, both the position and the pressing force of an object are detected at the same time within one detection period. To the drive electrodes Tx, a common drive signal is supplied in the first period and a write signal is supplied in the second period.

In another example, one frame period may be divided into three or more periods, and a display area DA is divided into a plurality of blocks. The display drive and sensing drive operations are performed in each block. That is, in a first period of one frame period, a first display drive is performed to write an image signal to pixels PX in a first display block of the display area DA. Then, in a second period after the first period, a first sensing drive is performed to detect a position and a pressing force of an object in a first sensing block of the display area DA. In the present embodiment, both the position and the pressing force of an object are detected at the same time within one sensing drive as to one sensing block. The first sensing block and the first display block may be the same block or different blocks. In a third period after the second period, a second display drive is performed to write an image signal to pixels PX in a second display block which is different from the first display block. In a fourth period after the third period, a second sensing drive is performed to detect a position and a pressing force of the object in a second sensing block which is different from the first sensing block. As above, the display drive and sensing drive operations are performed alternately in one frame period to write an image signal to the entire pixels PX in the display area DA while detecting the position and pressing force of the object in the entirety of the display area DA.

In FIGS. 7 to 10, a position of object A with respect to the sensor SE and a touch signal TS detected. In each figure, item (a) shows an position of object A with respect to the sensor SE and a touch signal TS measured at that time, as being viewed along arrow a of FIG. 6 which is parallel with the first direction X. The example depicted shows the touch signal TS output from electrode R6 of the detection electrodes Rx when electrodes T1 to T8 of the drive electrodes Tx are drives consecutively. In each figure, item (b) shows the position of object A with respect to the sensor SE and the touch signal TS measured at that time, as being viewed along arrow b of FIG. 6 which is parallel with the second direction Y. The example depicted shows the touch signal TS consecutively output from electrodes R1 to R8 when electrode T4 of the drive electrodes Tx is driven. Furthermore, in each figure, item (c) shows the distribution of the touch signal TS on the sensor SE, as being viewed from the input surface IS side.

Figure 7:
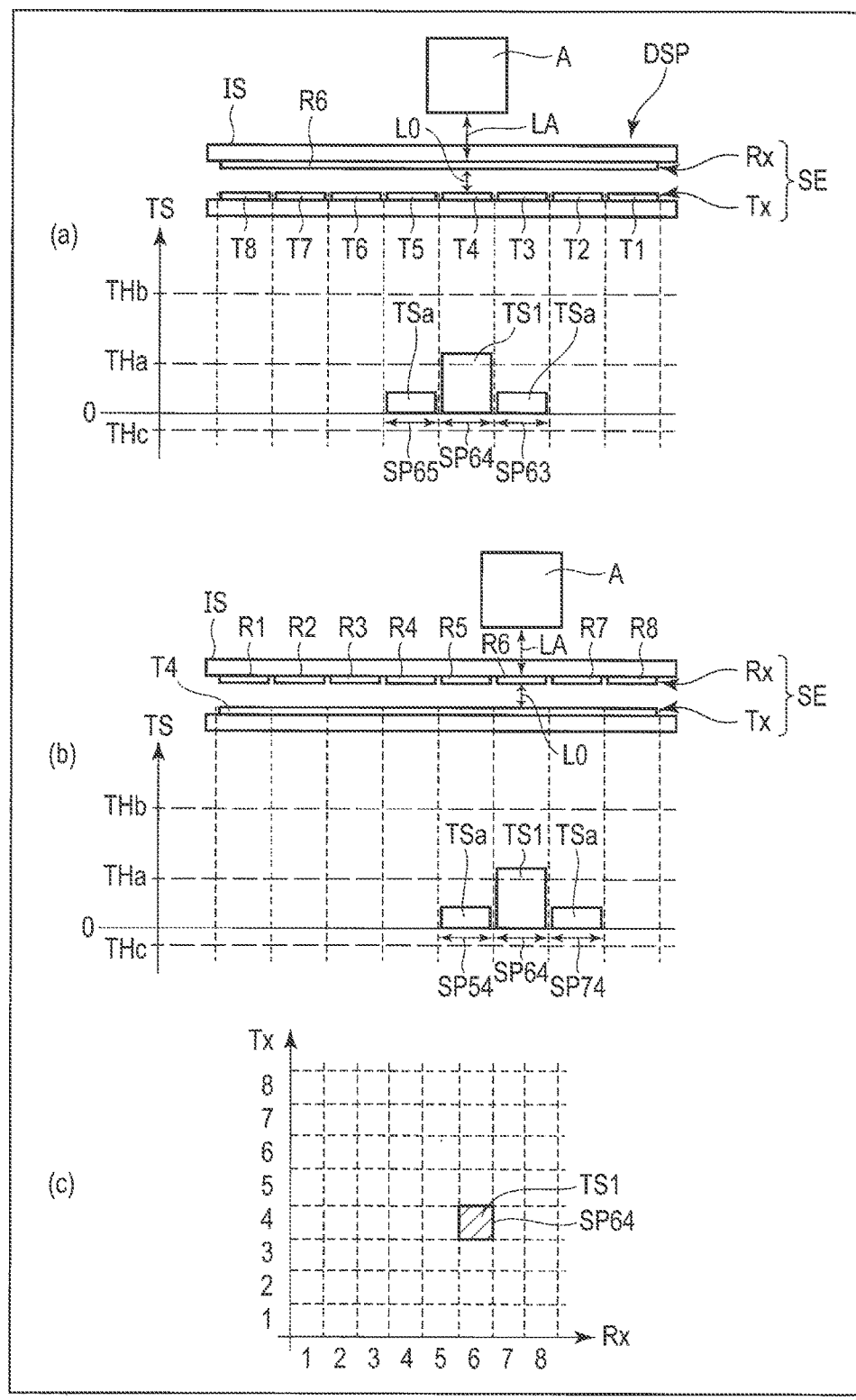
FIG. 7 shows a position of object A with respect to a sensor SE and touch signals TS measured when object A approaches the input surface IS.

FIG. 7 shows a position of object A with respect to the sensor SE and touch signals TS measured when object A approaches the input surface IS.

A value of the touch signal TS in the initial state where object A does not contact or approach the input surface IS is set as a reference value, which is 0 in this state. A positive threshold value which is greater than the reference value is a first threshold value THa, and a positive threshold value which is greater than the first threshold value THa is a second threshold value THb. A negative threshold value which is less than the reference value is a third threshold value THc. Amongst the positive touch signals TS which are greater than the reference value in FIGS. 7 to 10, those which are equal to or greater than the first threshold value THa but less than the second threshold value THb are referred to as touch signal TS1, those which are equal to or greater than the second threshold value THb are referred to as touch signal TS2, and those which are equal to or greater than the reference value but less than the first threshold value THa are referred to as touch signal TSa. Furthermore, amongst the negative touch signals TS which are less than the reference value in FIGS. 7 to 10, those which are equal to or less than the third threshold value THc are referred to as touch signal TS3, and those which are less than the reference value and greater than the third threshold value THc are referred to as touch signal TSc.

To drive the sensor SE, the drive IC chip IC1 initially writes a write signal to electrode T1 of the drive electrodes Tx to produce a sensor signal between electrode T1 and each electrode R of the detection electrodes Rx. Then, the drive IC chip IC2 reads a read signal indicative of a change in the sensor signal based on a change in interelectrode capacitance C from electrodes R1 to R8 of the detection electrodes Rx in this order. The same drive operation is performed with respect to electrodes T2 to T8 in this order. In the present application, the touch signal TS is a signal converted based on the read signal. That is, the touch signal TS changes based on a change in interelectrode capacitance C. When interelectrode capacitance C is at its initial capacitance C0, the touch signal TS is the reference value, that is, 0. When interference capacitance C is less than initial capacitance C0, the touch signal TS is a positive value. When interference capacitance C is greater than initial capacitance C0, the touch signal TS is a negative value.

The position and pressing force of object A can be detected from the size and position of the touch signal TS. Such a detection operation of the position and pressing force of object A is performed after detection of an entire screen distribution of interelectrode capacitance C between the detection electrodes Rx and the drive electrodes Tx in the display panel PNL as in FIG. 1. Note that the sensor SE is driven in the same manner in FIGS. 8 to 10.

Here, a crossing point of ith detection electrode: electrode Ri, and jth drive electrode: electrode Tj is denoted as point SPij. For example, a crossing point of electrode R6 of detection electrodes Rx and electrode T4 of drive electrode Tx is denoted as point SP64. Interelectrode capacitance C at point SPij is capacitance formed between electrode Tj and electrode Ri which is detected when a write signal is written in electrode Tj and a read signal is read from electrode Ri.

As in items (a) and (b) of FIG. 7, object A is in the close proximity of the input surface IS at point SP64. At the same time, object A approaches electrode R6 at position SP64 with gap LA therebetween. Given that interelectrode capacitance C at point SP64 is interelectrode capacitance C1, C1 is less than initial capacitance C0. Furthermore, gap L is equal to gap L0 of initial state.

As shown in item (a) of FIG. 7, a touch signal TS1 is produced at point SP64, and a touch signal TSa is produced at each of points SP63 and SP65. In item (b) of FIG. 7, the touch signal TS1 is produced at point SP64, and the touch signal TSa is produced at each of points SP54 and SP74.

Item (c) of FIG. 7 shows a distribution of the acquired touch signals TS. The area of touch signals TS1 is hatched. The touch signals TS acquired here are all positive. Note that the touch signals TSa which are less than the first threshold value THa are not reflected on the read signal Vr and thus not shown in item (c). Since the touch signal TS1 is detected only at point SP64, object A is determined to be positioned around point SP64. Furthermore, since the touch signal TS acquired at point SP64 is touch signal TS1, object A is determined to be approaching the input surface IS.

The above distribution of the touch signals TS indicates that object A is positioned at point SP64 with a gap LA between object A and the input surface IS.

Figure 8:
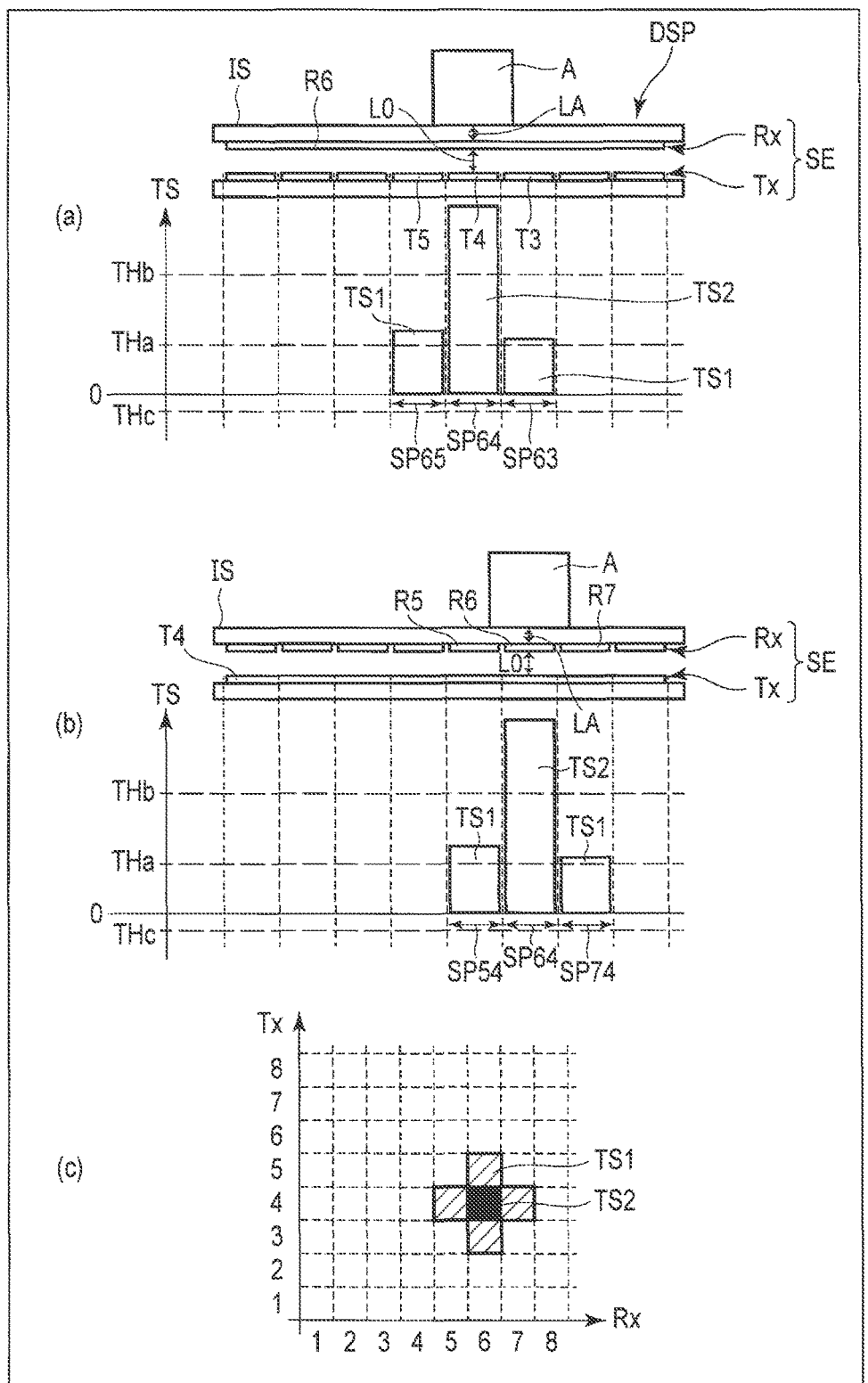
FIG. 8 shows a position of object A with respect to the sensor SE and touch signals TS measured when object A contacts the input surface IS.

FIG. 8 shows a position of object A with respect to the sensor SE and touch signals TS measured when object A contacts the input surface IS.

As in items (a) and (b) of FIG. 8, object A contacts the input surface IS at point SP64, and gap LA between object A and detection electrodes Rx is minimum. Given that interelectrode capacitance C is interelectrode capacitance C2, C2 is less than interelectrode capacitance C1. Here, gap L is equal to gap L0 of initial state.

As shown in item (a) of FIG. 8, a touch signal TS2 is produced at point SP64, and a touch signal TS1 is produced at each of points SP63 and SP65. In item (b) of FIG. 8, the touch signal TS2 is produced at point SP64, and the touch signal TS1 is produced at each of points SP54 and SP74.

Item (c) of FIG. 8 shows a distribution of the acquired touch signals TS. The area of touch signal TS2 is blacked out. The touch signals TS acquired here are all positive. In the distribution of the touch signals TS on the entirety of the sensor SE, the touch signal TS2 acquired at point SP64 is the greatest value, and object A is determined to be positioned around point SP64. Furthermore, from touch-signal distribution TS1 at points SP63, SP65, SP54, and SP74 around points SP64, object A is determined to be contacting the input surface IS.

The above distribution of the touch signals TS indicates that object A is positioned at point SP64 contacting the input surface IS.

As shown in FIGS. 7 and 8, when object A approaches or contacts the input surface IS, acquired touch signals TS are all positive. Furthermore, object A is positioned at a position SP where the greatest touch signal TS is detected, and a degree of approach or a contact of object A can be determined from a touch-signal distribution TS around the greatest touch signal TS.

Figure 9:
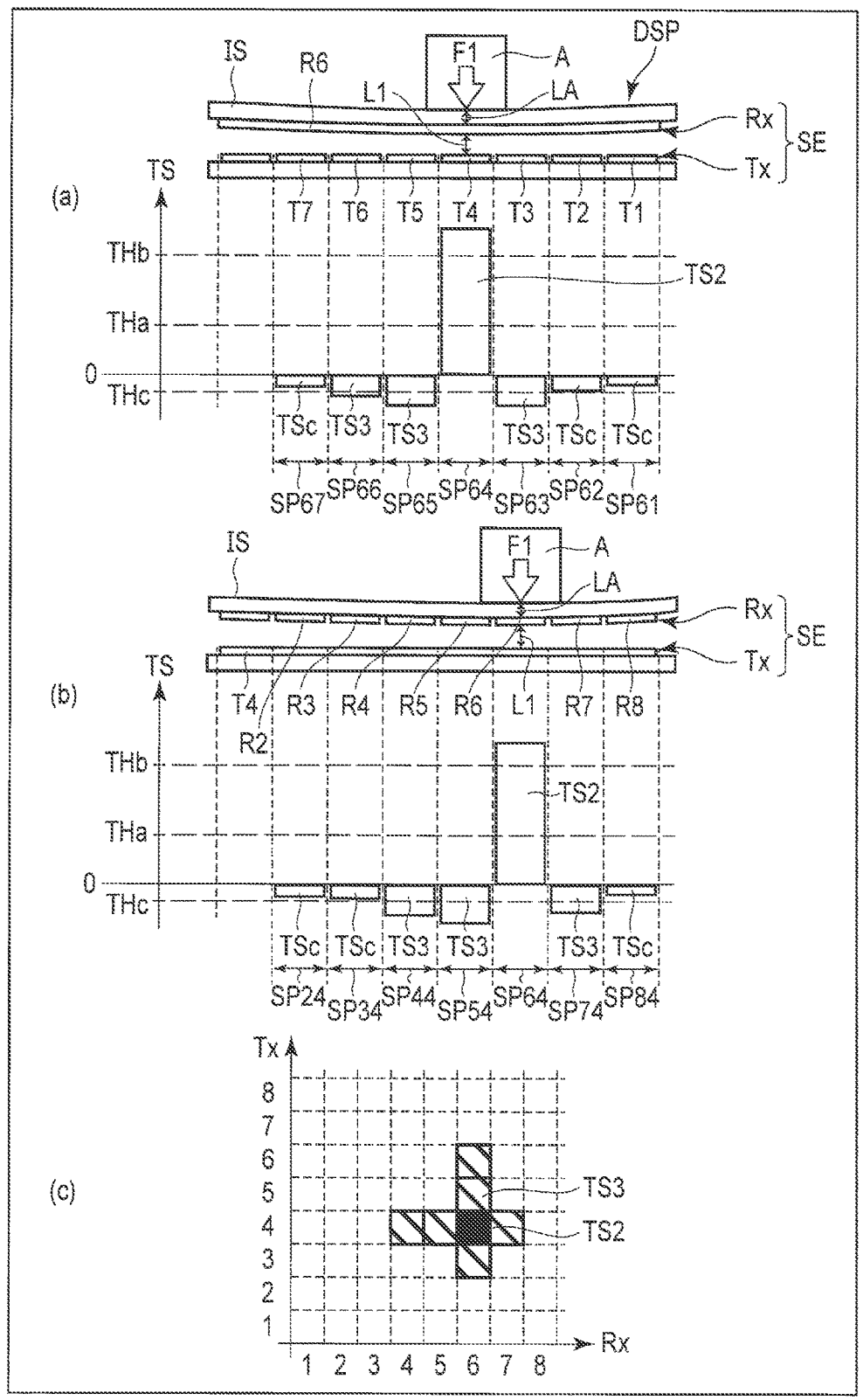
FIG. 9 shows a position of object A with respect to the sensor SE and touch signals TS measured when object A applies a pressing force F1 to the input surface IS.

FIG. 9 shows a position of object A with respect to the sensor SE and touch signals TS measured when object A applies pressing force F1 to the input surface IS.

As in items (a) and (b) of FIG. 9, object A applies pressing force F1 to the input surface IS at point SP64, and gap LA between object A and the detection electrodes Rx is minimum. Given that interelectrode capacitance C at point SP64 is interelectrode capacitance C3, C3 is greater than interelectrode capacitance C2 which is shown in FIG. 8. Furthermore, given that gap L is gap L1, L1 is less than gap L0 which is shown in FIGS. 7 and 8. Interelectrode capacitance C3 is a sum of a decrement of interelectrode capacitance from initial capacitance C0 measured when gap LA is minimized and an increment of interelectrode capacitance from initial capacitance C0 measured when gap L is reduced from L0 to L1.

Furthermore, at points SP61, SP62, SP63, SP65, SP66, SP67, SP24, SP34, SP44, SP54, SP74, and SP85 which surround point SP64, gap L is less than gap L0 and interelectrode capacitance C is greater than initial capacitance C0.

As in item (a) of FIG. 9, a touch signal TS2 is produced at point SP64, a negative touch signal TS3 is produced at each of points SP63, SP65, and SP66, and a negative touch signal TSc is produced at each of points SP61, SP62, and SP67. As in item (b) of FIG. 9, the touch signal TS2 is produced at point SP64, the negative touch signal TS3 is produced at each of points SP44, SP54, and SP74, and the negative touch signal STc is produced at each of points SP24, SP34, and SP84.

Item (c) of FIG. 9 shows a distribution of the acquired touch signals TS. The area of touch signals TS3 is hatched. Amongst the touch signals TS acquired here, only touch signal TS2 at point SP64 is positive, and the touch signals TS at the points SP other than point SP64 are all negative. Note that the touch signals TSc which are greater than the third threshold value THc are not reflected on the read signal Vr and thus not shown in item (c). In the distribution of the touch signals TS on the entirety of the sensor SE, the positive touch signal TS2 is detected only at point SP64, and thus, object A is determined to be positioned around point SP64. Furthermore, since the negative touch signals TS3 are acquired at points SP63, SP65, SP66, SP44, SP54, and SP74 which surround points SP64, object A is determined to be applying a pressing force to the input surface IS, and from the touch-signal distribution TS on the entirety of the sensor SE, the pressing force applied to the input surface IS is determined to be pressing force F1. That is, the position and the pressing force of object A are detected concurrently.

Here, when a finger Fg applies a pressing force to the input surface IS, electrodes R of the detection electrodes Rx are defined as follows: electrodes R capacitance C of which becomes less than initial capacitance C0 are defined as first electrodes; and electrodes R capacitance C of which becomes greater than initial capacitance C0 are defined as second electrodes. First capacitance is formed between the first electrodes and the drive electrodes Tx, and second capacitance is formed between the second electrodes and the drive electrodes Tx.

For example, as to electrode T4 of the drive electrodes Tx, electrode R6 corresponds to a first electrode, and one of electrodes R4, R5, and R7 corresponds to a second electrode. Therein, interelectrode capacitance C formed at point SP64 corresponds to first capacitance, and interelectrode capacitance C formed at points SP44, SP54, and SP74 correspond to second capacitance. The detector detects the position and the pressing force of object A based on a change in the first capacitance and a change in the second capacitance. Both the first capacitance and the second capacitance are equal to initial capacitance C0 before a pressing force is applied to the input surface IS by object A.

As shown in FIG. 9, when object A applies a pressing force to the input surface IS, the detector detects the first capacitance based on gap L between object A, the first electrode, and the drive electrodes Tx. Therein, the first capacitance becomes less than initial capacitance C0 by the pressing force applied by object A. That is, a decrement of interelectrode capacitance C caused by object A contacting the input surface IS is greater than an increment of interelectrode capacitance C caused by decreasing gap L, and the first capacitance becomes less than initial capacitance C0.

Furthermore, the detector detects the second capacitance based on a gap between the second electrode and the drive electrodes Tx. Therein, the second capacitance becomes greater than initial capacitance C0. That is, at points SP other than that of object A, gap L is reduced as compared to its initial state corresponding to a deformation of the cover member when the pressing force is applied to the input surface IS, and thus, interelectrode capacitance C increases. Therefore, the second capacitance is greater than initial capacitance C0.

From the above distribution of the touch signals TS, object A is determined to be positioned at point SP64 applying pressing force F1 to the input surface IS.

Figure 10:
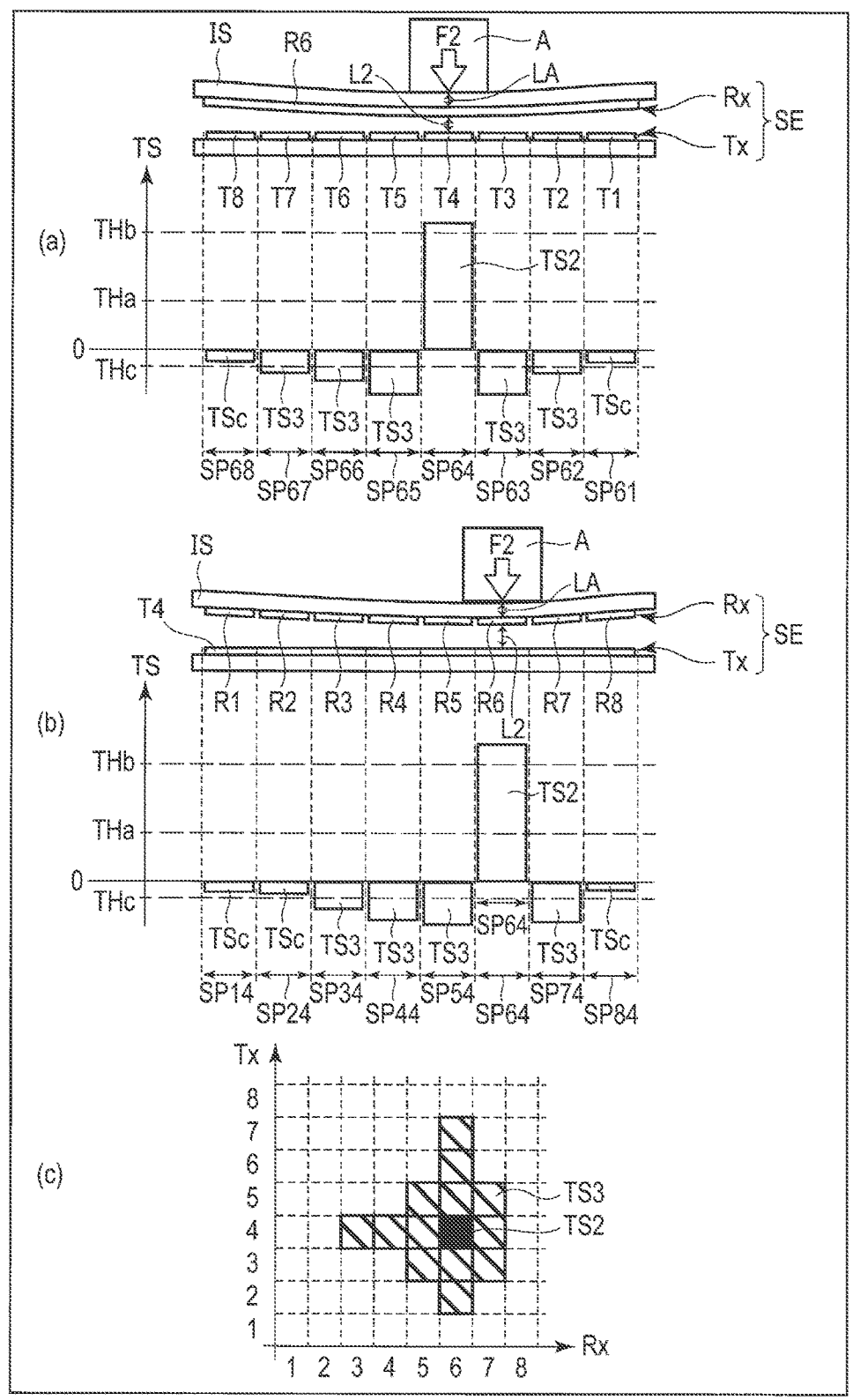
FIG. 10 shows a position of object A with respect to the sensor SE and touch signals TS measured when object A applies a pressing force F2 to the input surface IS.

FIG. 10 shows a position of object A with respect to the sensor SE and touch signals TS measured when object A applies pressing force F2 to the input surface IS. Pressing force F2 is greater than pressing force F1.

As in items (a) and (b) of FIG. 10, object A applies pressing force F2 to the input surface IS at point SP64, and gap LA between object A and the detection electrodes Rx is minimum. Given that interelectrode capacitance C at point SP64 is interelectrode capacitance C4, C4 is greater than interelectrode capacitance C3 which is shown in FIG. 9. Furthermore, given that gap L is gap L2, L2 is less than gap L1 which is shown in FIG. 9. Interelectrode capacitance C4 is a sum of a decrement of interelectrode capacitance from initial capacitance C0 measured when gap LA is minimized and an increment of interelectrode capacitance from initial capacitance C0 measured when gap L is reduced from L0 to L2. Here, since gap L2 is less than gap L1 which is shown in FIG. 9, interelectrode capacitance C4 is greater than interelectrode capacitance C3 in FIG. 9.

As in item (a) of FIG. 10, a touch signal TS2 is produced at point SP64, a negative touch signal TS3 is produced at each of points SP62, SP63, SP65, SP66, and SP67, and a negative touch signal TSc is produced at each of points SP61, and SP68. As in item (b) of FIG. 10, the touch signal TS2 is produced at point SP64, the negative touch signal TS3 is produced at each of points SP34, SP44, SP54, and SP74, and the negative touch signal STc is produced at each of points SP14, SP24, and SP84. Here, since interelectrode capacitance C4 is greater than interelectrode capacitance C3 which is shown in FIG. 9, the touch signal TS2 at point SP64 is less than the touch signal TS2 at point 64 in FIG. 9.

Item (c) of FIG. 10 shows a distribution of the acquired touch signals TS. Touch signals TS3 are acquired in points SP53, SP55, SP73, and SP75. Amongst the touch signals TS acquired here, only touch signal TS2 at point SP64 is positive, and the touch signals TS at the points SP other than point SP64 are all negative. In the distribution of the touch signals TS on the entirety of the sensor SE, positive touch signal TS2 is detected only at point SP64, and thus, object A is determined to be positioned around point SP64. Furthermore, since the negative touch signals TS3 are acquired at points SP62, SP63, SP65, SP65, SP66, SP67, SP34, SP44, SP54, SP74, SP53, SP55, SP73, and SP75 which surround point SP64, object A is determined to be applying a pressing force to the input surface IS, and from the touch-signal distribution TS on the entirety of the sensor SE, the pressing force applied to the input surface IS is determined to be pressing force F2. That is, similarly to the case of FIG. 9, the position and the pressing force of object A are detected concurrently. Furthermore, since pressing force F2 is greater than pressing force F1, touch-signal distribution TS3 of item (c) of FIG. 10 is greater than touch-signal distribution TS3 of item (c) of FIG. 9.

From the above distribution of the touch signals TS, object A is determined to be positioned at point SP64 applying pressing force F2 to the input surface IS.

Note that, in FIGS. 7 to 10, the number of detection electrodes Rx are eight (electrodes R1 to R8) and the number of drive electrodes Tx are eight (electrodes T1 to T8); however, the number of detection electrodes Rx and the number of drive electrodes Tx are not limited thereto. The number may be any of two to seven, or nine, or more.

Furthermore, the range of threshold value is not limited to the depicted one, and more specific range may be set. Note that, in the above description, threshold values are used to indicate the magnitude of touch signals TS; however, instead of such threshold values, an increment and decrement of touch signals TS with reference to a reference value may be used to detect a position and a pressing force of an object. Furthermore, in the examples of FIGS. 7 to 10, object A is positioned at the crossing point of one electrode R and one electrode T; however, a size of object A and a size of electrodes R and electrodes T are not limited. One object A may press several points SP at the same time. In such a case, the touch-signal distribution TS obtained thereby becomes more complicated because of increase of the number of electrodes R and electrodes T corresponding to the points pressed by object A.

The sensor-equipped display device of the present embodiment includes drive electrodes Tx and detection electrodes Rx by which a contact or an approach of object A can be detected, wherein a gap L between drive electrodes Tx and detection electrode Rx is changed based on a pressing force. Thus, when object A presses a surface of the device, interelectrode capacitance C increases by object A approaching detection electrodes Rx but decreases by object A contacting thereto. Especially, at the point pressed by object A, a decrement of interelectrode capacitance C by object contacting thereto is greater than an increment of interelectrode capacitance C by decreasing gap L. Therefore, capacitance at the pressed point becomes smaller than initial capacitance C0 where no pressure is applied. On the other hand, around the pressure point, an increment of interelectrode capacitance C is greater than a decrement of interelectrode capacitance C, and capacitance becomes greater than initial capacitance C0. By detecting changes in interelectrode capacitance C between detections electrodes Rx and drive electrodes Tx, whether or not there is pressure by object A can be detected, and if there is, a pressing position can be detected.

Furthermore, a gap L between detection electrodes Rx and drive electrodes Tx changes depending on the magnitude of the pressing force. Therefore, by detecting a change in interelectrode capacitance C (or the magnitude of touch signals) between detection electrodes Rx and drive electrodes Tx, the pressing force can be detected. Therefore, the sensor-equipped display device of high performance can be presented.

With the structure explained as above, a pressing force can be detected in a liquid crystal display device DSP including a cover member CG on the basis of a change in interelectrode capacitance C in a sensor SE.

Now, a variation of the present embodiment will be explained.

Figure 11:
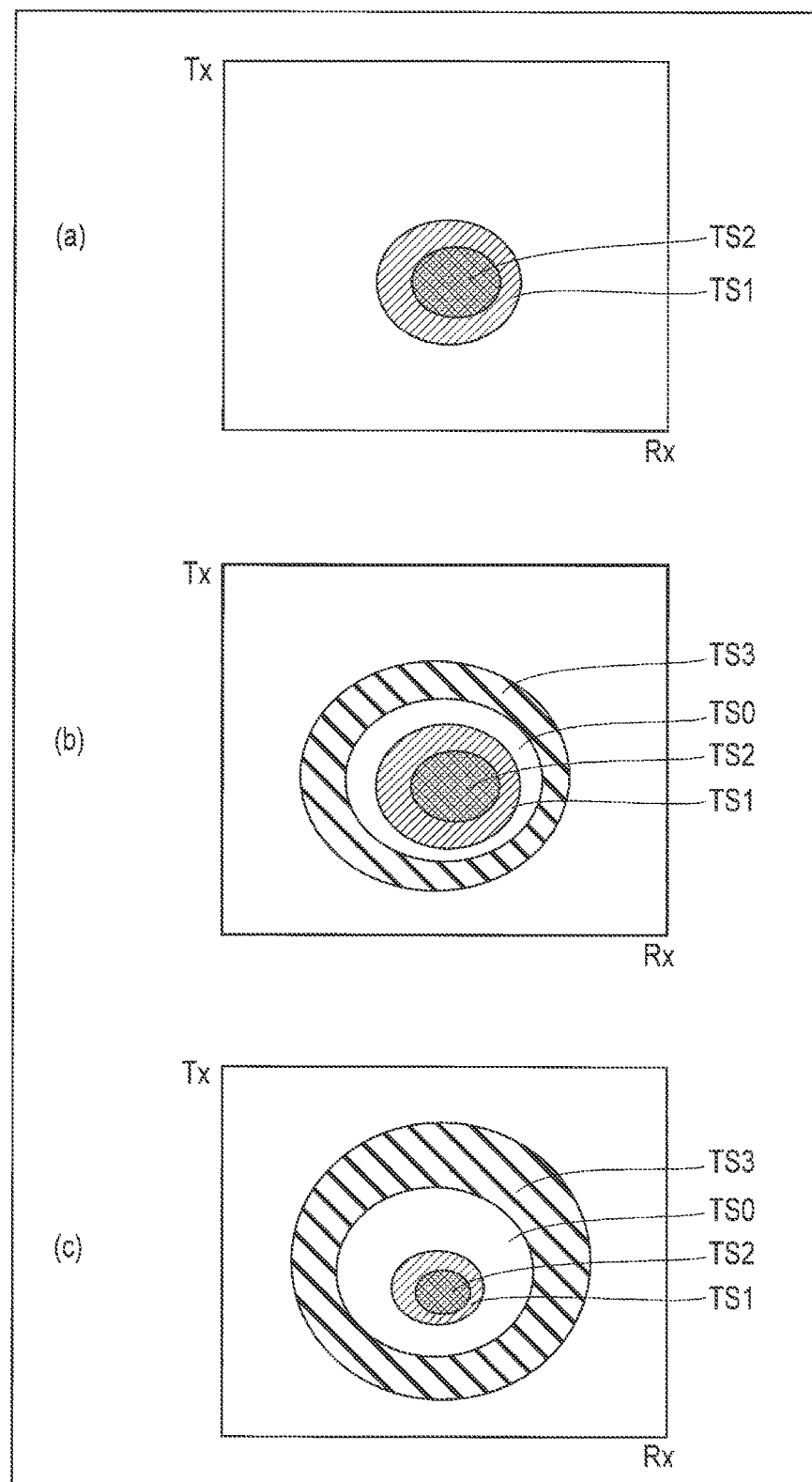
FIG. 11 shows distributions of a pressing force detected by the sensor SE.

FIG. 11 shows distributions of a pressing force detected by the sensor SE. FIG. 11 shows the distributions of touch signals TS on the sensor SE as being viewed from the input surface IS side. The number of detection electrodes Rx and drive electrodes Tx is not specified here, and distributions of obtained touch signals TS are depicted by curves. When the number of detection electrodes Rx and drive electrodes Tx increases, touch-signal distribution TS approximates to curves as in FIG. 11.

Item (a) of FIG. 11 shows distributions of touch signals TS when object A contacts the input surface IS as in FIG. 8. Touch-signal distribution TS1 surrounds touch-signal distribution TS2.

From the distributions of touch signals TS, the position of object A is detected, and a contact of object A to the input surface IS is detected.

Item (b) of FIG. 11 shows distributions of touch signals TS when pressing force F1 is applied to the input surface IS by object A as in FIG. 9. As in item (a) of FIG. 11, touch-signal distribution TS1 surrounds touch-signal distribution TS2 in item (b) of FIG. 11. Furthermore, touch-signal distribution TS3 surrounds touch-signal distribution TS1 with an area TS0 interposed therebetween.

From the distributions of touch signals TS, the position of object A is detected, and pressing force F1 applied to the input surface IS by object A is detected.

Item (c) of FIG. 11 shows distributions of touch signals TS when pressing force F2 is applied to the input surface IS by object A as in FIG. 10.

As in item (b), touch-signal distribution TS1 surrounds touch-signal distribution TS2 and touch-signal distribution TS3 surrounds touch-signal distribution TS1 with area TS0 interposed therebetween in item (c) of FIG. 11. Comparing item (c) to item (b), areas of touch-signal distribution TS1 and touch-signal distribution TS2 are smaller but areas of the area TS0 and touch-signal distribution TS3 are larger in item (c).

From the distributions of touch signals TS, the position of object A is detected, and pressing force F2 applied to the input surface IS by object A is detected.

FIG. 12 shows another example of distributions of a pressing force detected by the sensor SE. In the example of FIG. 1, two distributions of touch signals TS2 are detected. Distributions of touch signals TS1 separately surround the distributions of touch signals TS2. Touch-signal distribution TS3 surround the distributions of touch signals TS1 surrounding the distributions of touch signals TS2 with an area TS0 interposed therebetween.

From such distributions of touch signals TS, a position and a pressing force of each of two objects can be detected. Note that the number of detectable objects is not limited to two and three or more objects pressing concurrently can be detected.

FIG. 13 shows another example of the embodiment.

As compared to FIG. 1, the structure between the cover member CG and the display panel PNL is different in FIG. 13. Here, a liquid layer LL is used as a capacitance-change layer CC.

Supporting units SU are formed between the cover member CG and the display panel PNL. The supporting units SU are formed as walls standing in the third direction Z to surround the display area DA. The supporting units SU further surround the second optical element OD2. Spherical spacers PS are disposed between the antistatic layer AS and the second optical element OD2, and a gap is formed between the cover member CG and the display panel PNL. The spherical spacers PS are formed of, for example, elastic resin.

The space defined by the cover member CG, display panel PNL, and supporting units SU is filled with a liquid to form the liquid layer LL. The liquid used in the liquid layer LL is, for example, glycerin. The refractive index of the liquid is ±0.1 times that of the cover member CG.

In this example, the spacers PS are spherical; however, the shape of the spacer can be modified in various ways. For example, a plurality of columnar spacers having different heights may be disposed. Furthermore, an air gap layer may be formed in the space in which the liquid of the liquid layer LL is filled. Even if the capacitance-change layer CC is structured as above, the cover member is deformed by a pressing force, and the same advantage as in the embodiment can be achieved.

As explained above, the embodiment can present the sensor-equipped display device of high performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, drive electrode Tx may extend in the second direction Y and detection electrodes Rx may extend in the first direction X.

Drive IC chips IC1 and IC2 may be formed integrally. That is, drive IC chips IC1 and IC2 may be integrated into a single drive IC chip. In such a case, the single drive IC chip is connected to the display panel PNL, detector DT, and control module CM to supply a common drive signal Vcom to drive electrodes Tx, to write a write signal to drive electrodes Tx or detection electrodes Rx, and to read a read signal from detection electrodes Rx.

The driver is not limited to the drive IC chips IC1 and IC2 and the control module CM and may be modified in various ways as long as both the display panel PNL and the sensor SE can be driven thereby.

In the above detailed description, a liquid crystal display device has been used as an example of the display devices adoptable to the technique of the present application. However, the above embodiment is applicable to various flat-panel display devices such as an organic electroluminescent display device, a self-luminous display device, and an electronic paper display device with electrophoretic elements and the like. Furthermore, the above embodiment is, as a matter of course, applicable to small, medium, and large display devices.

What is claimed is:

1. A sensor-equipped display device, comprising:
a drive electrode;
a detection electrode including a first electrode and a second electrode disposed such that a gap is formed between the first electrode and the drive electrode and a gap is formed between the second electrode and the drive electrode, both of which change corresponding to a pressing force applied to the first and second electrodes;
a driver configured to write a write signal to the drive electrode to produce a sensor signal corresponding to a capacitance between the drive electrode and the detection electrode;
a detector configured to read a signal indicative of a change in the sensor signal from the detection electrode;
a display panel including the drive electrode;
an input surface which an object approaches or contacts; and
a capacitance-change layer located outside the display panel, the capacitance-change layer being elastically deformable according to a pressing force applied externally,
wherein the detection electrode is located outside the display panel,
wherein the detector detects a position and a pressing force of an object on the basis of a change in a first capacitance between the first electrode and the drive electrode and a change in a second capacitance between the second electrode and the drive electrode,
wherein the first capacitance and the second capacitance are equivalent to an initial capacitance before the object pressing, contacting or approaching the input surface,
wherein when the object contacts the input surface, the first capacitance and the second capacitance become less than the initial capacitance, and
wherein upon application of the pressing force of the object which is at a position overlapping the first electrode, the first capacitance becomes less than the initial capacitance and the second capacitance becomes greater than the initial capacitance.

2. The sensor-equipped display device of claim 1, wherein the detector detects the first capacitance on the basis of a gap between the object, the first electrode, and the drive electrode, and detects the second capacitance on the basis of a gap between the second electrode and the drive electrode.

3. The sensor-equipped display device of claim 1, wherein the display panel includes a plurality of pixel electrodes opposed to the drive electrode.

4. The sensor-equipped display device of claim 3, wherein the detector detects the position of the object and the pressing force applied by the object after detecting an entire screen distribution of capacitance between the detection electrode and the drive electrode on the display panel.

5. The sensor-equipped display device of claim 3, wherein a display period in which an image is displayed and a detection period in which the position and the pressing force of the object are detected are adopted, and to the drive electrode, a common drive signal is supplied during the display period and the write signal is supplied during the detection period.

6. The sensor-equipped display device of claim 3, further comprising a cover member opposed to the display panel, wherein the detection electrode is formed on the cover member to be opposed to the display panel.

7. The sensor-equipped display device of claim 1, wherein the detector detects positions and pressing forces of a plurality of objects.

8. The sensor-equipped display device of claim 1, wherein the capacitance-change layer is one of a resin layer, film, liquid layer, and air gap.

9. The sensor-equipped display device of claim 1, wherein the display panel includes a first substrate, a second substrate opposed to the first substrate, and a liquid crystal layer between the first substrate and the second substrate.

10. The sensor-equipped display device of claim 9, further comprising a polarizer between the capacitance-change layer and the second substrate.

11. The sensor-equipped display device of claim 10, wherein the second substrate is located between the drive electrode and the detection electrode.

12. The sensor-equipped display device of claim 1, wherein
when the object contacts the input surface at the position overlapping the first electrode, the first capacitance becomes less than the second capacitance.

13. The sensor-equipped display device of claim 1, wherein
the capacitance between the drive electrode and the detection electrode decreases because of a capacitance between the object and the drive electrode, and increases when the gap between the drive electrode and the detection electrode becomes smaller, and
wherein upon application of the pressing force of the object which is at the position overlapping the first electrode,
a decrement of the capacitance between the object and the drive electrode is greater than an increment of the capacitance which increases when the gap between the drive electrode and the detection electrode becomes smaller, and the first capacitance becomes less than the initial capacitance, and
the increment of the capacitance which increases when the gap between the drive electrode and the detection electrode becomes smaller is greater than the decrement of the capacitance between the object and the drive electrode, and the second capacitance becomes greater than the initial capacitance.

* * * * *